(12) United States Patent
Doering et al.

(10) Patent No.: US 10,416,372 B2
(45) Date of Patent: Sep. 17, 2019

(54) APPLIANCE WITH A CONTROL PANEL

(71) Applicant: Haier US Appliance Solutions, Inc., Wilmington, DE (US)

(72) Inventors: Tyler James Doering, Louisville, KY (US); Corey Phillip Polhamus, Coxs Creek, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 181 days.

(21) Appl. No.: 15/604,736

(22) Filed: May 25, 2017

(65) Prior Publication Data

US 2018/0340728 A1  Nov. 29, 2018

(51) Int. Cl.
| | |
|---|---|
| *F25D 29/00* | (2006.01) |
| *F21V 8/00* | (2006.01) |
| *H05K 5/00* | (2006.01) |
| *F25D 23/12* | (2006.01) |

(52) U.S. Cl.
CPC .......... *G02B 6/0055* (2013.01); *G02B 6/009* (2013.01); *G02B 6/0083* (2013.01); *G02B 6/0088* (2013.01); *G02B 6/0095* (2013.01); *H05K 5/0017* (2013.01); *F25D 23/126* (2013.01); *F25D 29/00* (2013.01); *F25D 2400/361* (2013.01)

(58) Field of Classification Search
None
See application file for complete search history.

(56) References Cited

U.S. PATENT DOCUMENTS

| 7,573,701 B2 | 8/2009 | Doberstein et al. | |
|---|---|---|---|
| 8,339,293 B2 | 12/2012 | Burchill | |
| 2014/0160730 A1* | 6/2014 | Doering | F24C 15/008 362/92 |
| 2014/0165613 A1* | 6/2014 | Waugh | F25D 29/00 62/56 |
| 2014/0166153 A1* | 6/2014 | Waugh | F17D 3/00 141/1 |
| 2015/0101669 A1* | 4/2015 | Krause | F17D 3/01 137/1 |
| 2016/0299770 A1* | 10/2016 | Doering | G06F 13/102 |

\* cited by examiner

*Primary Examiner* — Elmito Breval
(74) *Attorney, Agent, or Firm* — Dority & Manning, P.A.

(57) ABSTRACT

An appliance includes a control panel with a dielectric substrate. A printed circuit board is spaced from a back surface of the dielectric substrate. A light emitter and a capacitive sensor are positioned on the printed circuit board. The capacitive sensor includes a pair of conductive bodies that extend between the dielectric substrate and the printed circuit board. The dielectric substrate is positioned on a cabinet such that the capacitive sensor is triggered when a user touches a front surface of the dielectric substrate and such that an appliance function indicator is illuminated at the front surface of the dielectric substrate during operation of the light emitter.

18 Claims, 5 Drawing Sheets

APPLIANCE WITH A CONTROL PANEL

FIELD OF THE INVENTION

The present subject matter relates generally to control panels for appliances, such as refrigerator appliances or range appliances.

BACKGROUND OF THE INVENTION

Appliances generally include a control panel having a plurality of buttons, keys, or other input devices. Utilizing the control panel, an appliance user can input control commands to the appliance and operate the appliance. Certain control panels include capacitive touch sensors that utilize a user's body capacitance to operate. In particular, capacitive touch sensors can detect a change in capacitance when the user touches the control panel.

Capacitive touch sensors have various benefits. For example, capacitive touch sensors can assist with providing a clean appearance for an associated appliance. In particular, capacitive touch sensors are frequently positioned behind a dielectric panel. A user touches an outer surface of the dielectric panel opposite the capacitive touch sensors to actuate the capacitive touch sensors. The smooth outer surface can have a pleasant cosmetic appearance, e.g., particularly compared to tactile buttons, knobs, etc.

Marking or illuminating the dielectric panel to inform the user where a particular capacitive touch sensor is located behind the dielectric panel is challenging. For example, certain appliances include two printed circuit boards (PCB) with the capacitive touch sensors mounted on one of the PCBs and light emitting diodes mounted on the other of the PCBs. The PCB with the capacitive touch sensors is positioned at the dielectric panel, and the light emitting diodes on the other PCB are aligned with holes on the PCB with the capacitive touch sensors to allow light to pass through to the dielectric panel. Each separate PCB increases the cost and complexity of the associated appliance.

Accordingly, a control panel for an appliance that includes capacitive touch sensors and features for backlighting touch point information for the capacitive touch sensors would be useful.

BRIEF DESCRIPTION OF THE INVENTION

The present subject matter provides an appliance with a control panel. The control panel includes a dielectric substrate. A printed circuit board is spaced from a back surface of the dielectric substrate. A light emitter and a capacitive sensor are positioned on the printed circuit board. The capacitive sensor includes a pair of conductive bodies that extend between the dielectric substrate and the printed circuit board. The dielectric substrate is positioned on a cabinet such that the capacitive sensor is triggered when a user touches a front surface of the dielectric substrate and such that an appliance function indicator is illuminated at the front surface of the dielectric substrate during operation of the light emitter. Additional aspects and advantages of the invention will be set forth in part in the following description, or may be apparent from the description, or may be learned through practice of the invention.

In a first exemplary embodiment, an appliance includes a cabinet. A control panel is mounted to the cabinet. The control panel includes a dielectric substrate having a front surface and a back surface. The front and back surfaces are positioned opposite each other on the dielectric substrate. A printed circuit board is spaced from the back surface of the dielectric substrate. A light emitter is positioned on the printed circuit board. A capacitive sensor is also positioned on the printed circuit board. The capacitive sensor includes a pair of conductive bodies that extend between the dielectric substrate and the printed circuit board. Each conductive body of the pair of conductive bodies provides a conductive electrical coupling between the dielectric substrate and a respective electrode of the capacitive sensor. The light emitter is positioned between the conductive bodies of the pair of conductive bodies. The dielectric substrate is positioned on the cabinet such that the front surface of the dielectric substrate faces outwardly, such that the capacitive sensor is triggered when a user touches the front surface of the dielectric substrate, and such that an appliance function indicator is illuminated at the front surface of the dielectric substrate during operation of the light emitter.

In a second exemplary embodiment, an appliance includes a cabinet. A control panel is mounted to the cabinet. The control panel includes a dielectric substrate that has a front surface and a back surface. The front and back surfaces are positioned opposite each other on the dielectric substrate. A printed circuit board is spaced from the back surface of the dielectric substrate. A light emitting diode is positioned on the printed circuit board. A capacitive sensor is also positioned on the printed circuit board. The capacitive sensor includes a pair of conductive bodies that are compressed between the dielectric substrate and the printed circuit board. Each conductive body of the pair of conductive bodies provides a conductive electrical coupling between the dielectric substrate and a respective electrode of the capacitive sensor. The light emitting diode is positioned between the conductive bodies of the pair of conductive bodies. Each conductive body of the pair of conductive bodies includes a foam block covered with a conductive fabric. A light guide is positioned between the dielectric substrate and the printed circuit board. The light guide is positioned such that light emitted by the light emitting diode is reflected by the light guide towards the dielectric substrate during operation of the light emitting diode. The dielectric substrate is positioned on the cabinet such that the front surface of the dielectric substrate faces outwardly, such that the capacitive sensor is triggered when a user touches the front surface of the dielectric substrate, and such that an appliance function indicator is illuminated at the front surface of the dielectric substrate during operation of the light emitting diode.

In a third exemplary embodiment, an appliance includes a cabinet. A control panel is mounted to the cabinet. The control panel includes a dielectric substrate that has a front surface and a back surface. The front and back surfaces are positioned opposite each other on the dielectric substrate. A printed circuit board is spaced from the back surface of the dielectric substrate. A light emitting diode is positioned on the printed circuit board. A capacitive sensor is also positioned on the printed circuit board. The capacitive sensor includes a conductive body that is compressed between the dielectric substrate and the printed circuit board. The conductive body provides a conductive electrical coupling between the dielectric substrate and an electrode of the capacitive sensor. A light guide is positioned between the dielectric substrate and the printed circuit board. The light guide is positioned such that light emitted by the light emitting diode is reflected by the light guide towards the dielectric substrate during operation of the light emitting diode. The dielectric substrate is positioned on the cabinet such that the front surface of the dielectric substrate faces outwardly, such that the capacitive sensor is triggered when a user touches the front surface of the dielectric substrate, and such that an appliance function indicator is illuminated at the front surface of the dielectric substrate during operation of the light emitting diode.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
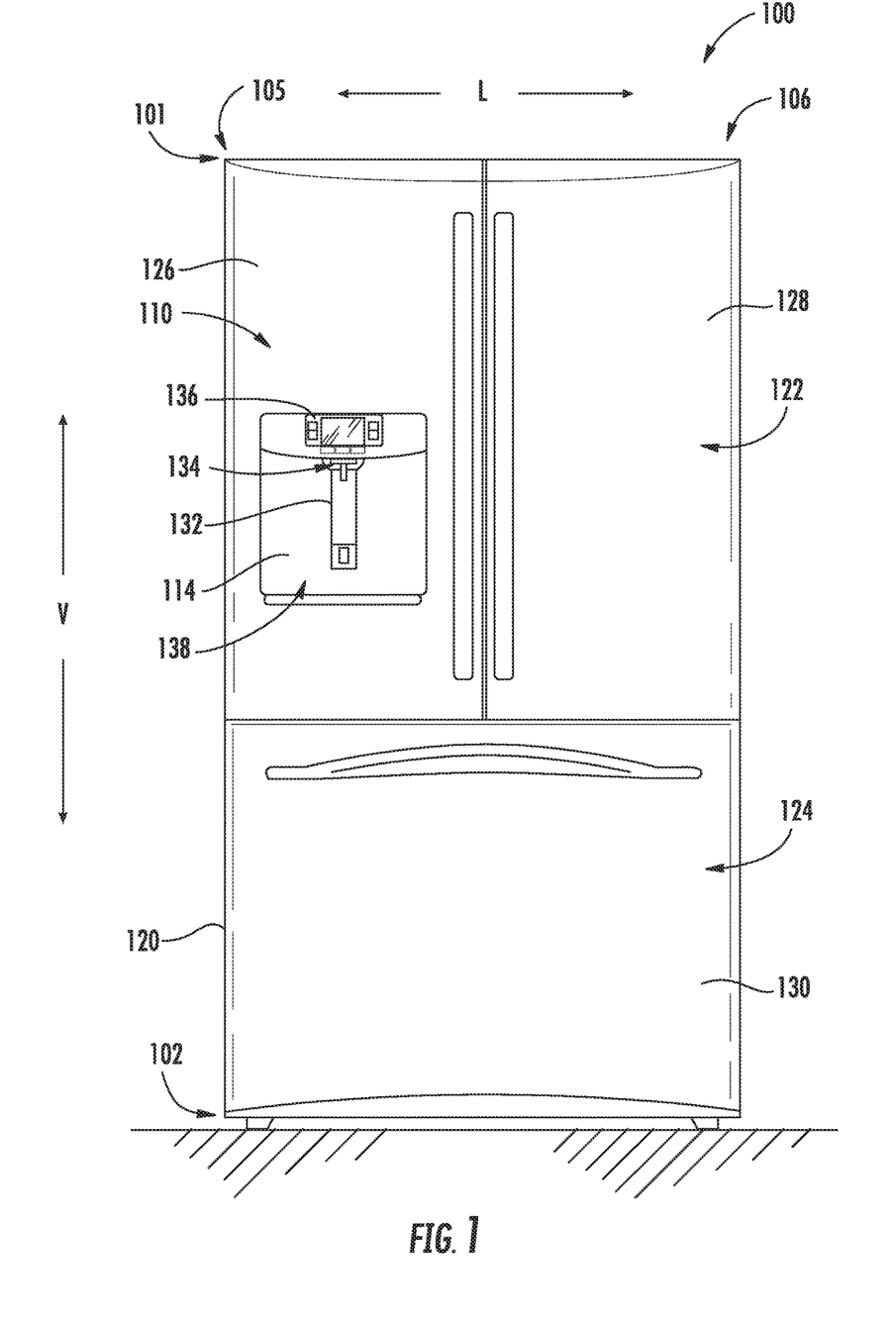
FIG. 1 provides a front, elevation view of a refrigerator appliance according to an exemplary embodiment of the present subject matter.

FIG. 1 provides a front, elevation view of a refrigerator appliance 100 according to an exemplary embodiment of the present subject matter. Refrigerator appliance 100 defines a vertical direction V. Refrigerator appliance 100 extends between an upper portion 101 and a lower portion 102 along the vertical direction V.

Refrigerator appliance 100 includes a cabinet or housing 120 that defines chilled chambers for receipt of food items for storage. In particular, refrigerator appliance 100 defines fresh food chamber 122 at upper portion 101 of refrigerator appliance 100 and a freezer chamber 124 arranged below fresh food chamber 122 on the vertical direction V, e.g., at lower portion 102 of refrigerator appliance 100. As such, refrigerator appliance 100 is generally referred to as a bottom mount refrigerator appliance. However, using the teachings disclosed herein, one of skill in the art will understand that the present subject matter may be used with other types of refrigerator appliances (e.g., side-by-side style or top mount style) or a freezer appliance as well. Consequently, the description set forth herein is for illustrative purposes only and is not intended to limit the present subject matter to any particular style of refrigerator appliance or arrangement of chilled chambers.

Refrigerator doors 126 and 128 are rotatably hinged to an edge of housing 120 for accessing fresh food compartment 122. A freezer door 130 is arranged below refrigerator doors 126 and 128 for accessing freezer chamber 124. Freezer door 130 is coupled to a freezer drawer (not shown) slidably mounted within freezer chamber 124.

Refrigerator appliance 100 also includes a dispensing assembly 110 for dispensing water and/or ice. Dispensing assembly 110 includes a dispenser 114 positioned on or mounted to an exterior portion of refrigerator appliance 100, e.g., on refrigerator door 126. Dispenser 114 includes a discharging outlet 134 for accessing ice and water. A sensor 132, such as an ultrasonic sensor, is mounted below discharging outlet 134 for operating dispenser 114. In alternative exemplary embodiments, any suitable actuator may be used to operate dispenser 114. For example, dispenser 114 can include a paddle or button rather than sensor 132. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and sensor 132 are an external part of dispenser 114 and are mounted in a dispenser recess 138 defined in an outside surface of refrigerator door 126. Dispenser recess 138 is positioned at a predetermined elevation convenient for a user to access ice or water and enabling the user to access ice without the need to bend-over and without the need to access freezer chamber 124. In the exemplary embodiment, dispenser recess 138 is positioned at a level that approximates the chest level of a user.

Operation of the refrigerator appliance 100 can be regulated by a controller (not shown) that is operatively coupled to user interface panel 136 and/or sensor 132. Panel 136 provides selections for user manipulation of the operation of refrigerator appliance 100 such as e.g., selections between whole or crushed ice, chilled water, and/or other options as well. In response to user manipulation of the user interface panel 136, the controller operates various components of the refrigerator appliance 100. The controller may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller may be positioned in a variety of locations throughout refrigerator appliance 100. In the illustrated embodiment, the controller may be located within the control panel area of refrigerator door 126. In such an embodiment, input/output ("I/O") signals may be routed between the controller and various operational components of refrigerator appliance 100. The user interface 136 may be in communication with the controller via one or more signal lines or shared communication busses.

Figure 2:
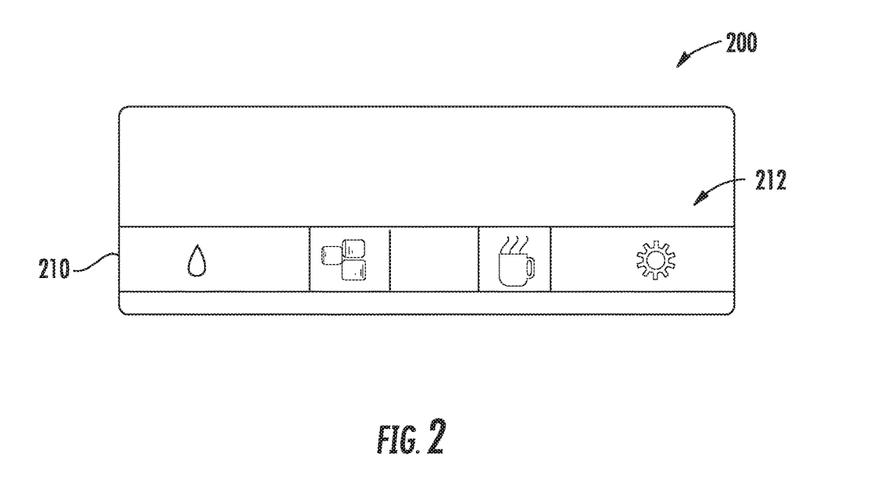
FIGS. 2 and 3 provide elevation views of a control panel according to an exemplary embodiment of the present subject matter.
Figure 3:
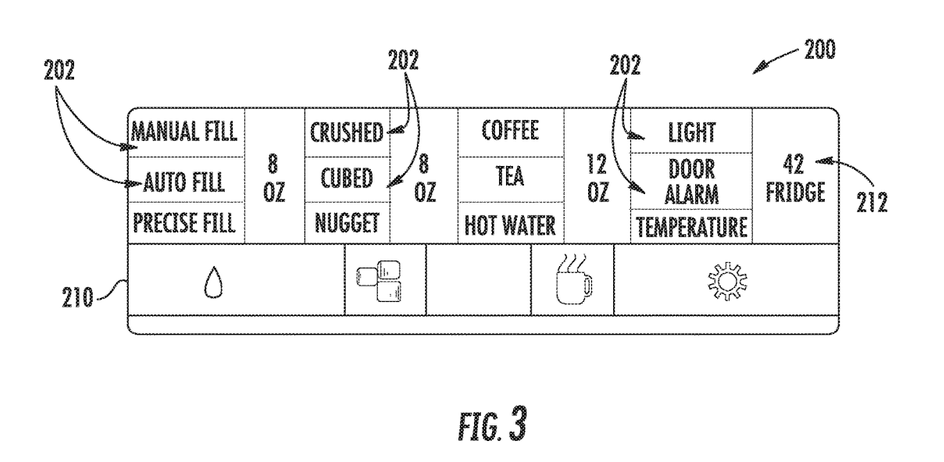

FIGS. 2 and 3 provide front elevation views of a control panel 200 according to an exemplary embodiment of the present subject matter. In FIG. 2, appliance function indicators 202 of control panel 200 are not backlit. Conversely, control panel 200 is illuminated such that appliance function indicators 202 are backlit in FIG. 3. Control panel 200 may be used in refrigerator appliance 100 as user interface panel 136. As another example, control panel 200 may be configured for use in a range appliance. Thus, while described below in the context of refrigerator appliance 100, it will be understood using the teachings disclosed herein that the present subject matter may be configured for use in any suitable appliance. As discussed in greater detail below, control panel 200 includes features for providing a dead front user interface when control panel 200 is inactive, e.g., as shown in FIG. 2, while also backlighting capacitive touch sensor locations when control panel 200 is active, e.g., as shown in FIG. 3.

Figure 4:
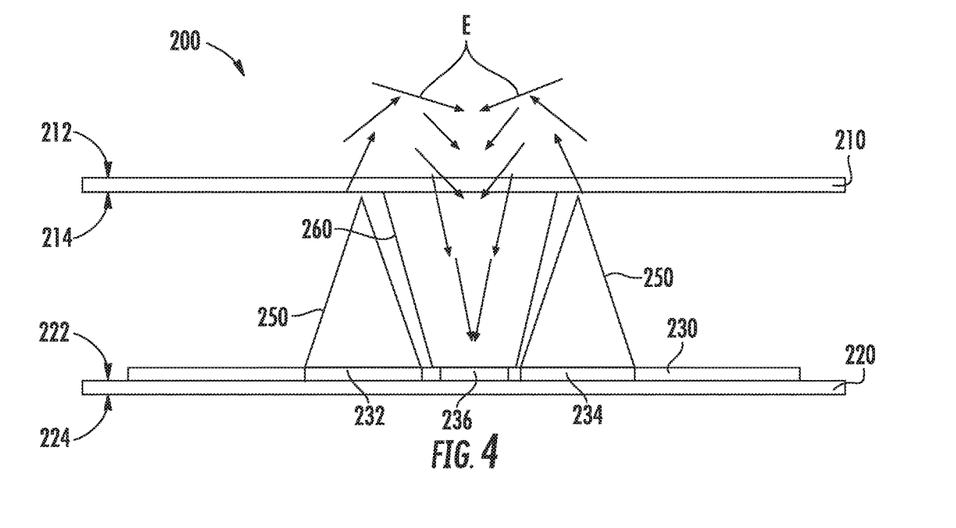
FIGS. 4 and 5 provide schematic views of one arrangement of the exemplary control panel of FIG. 2.
Figure 5:
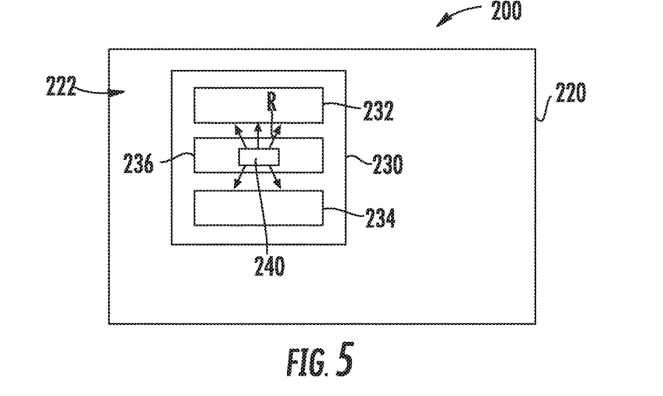
Figure 6:
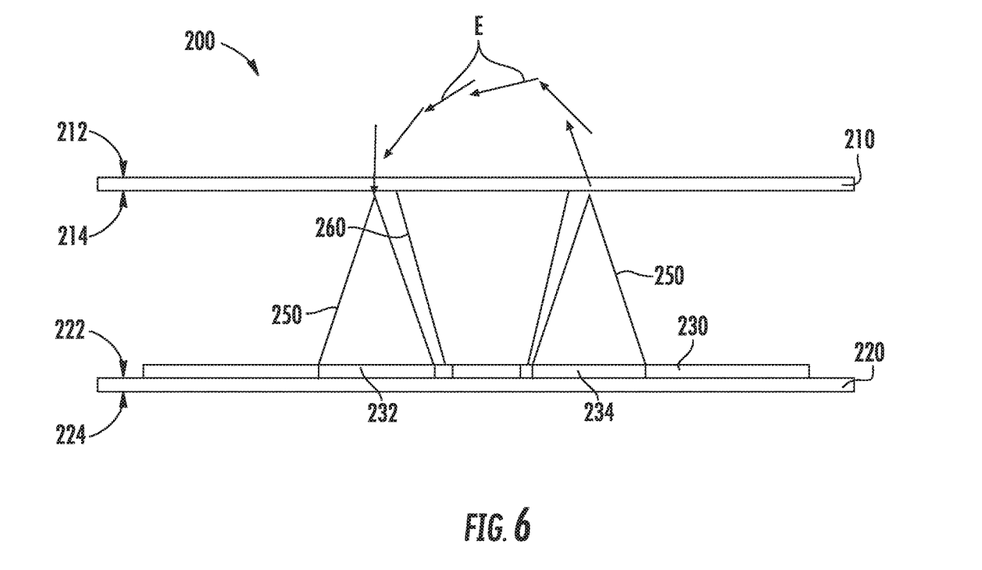
FIGS. 6 and 7 provide schematic views of another arrangement of the exemplary control panel of FIG. 2.
Figure 7:
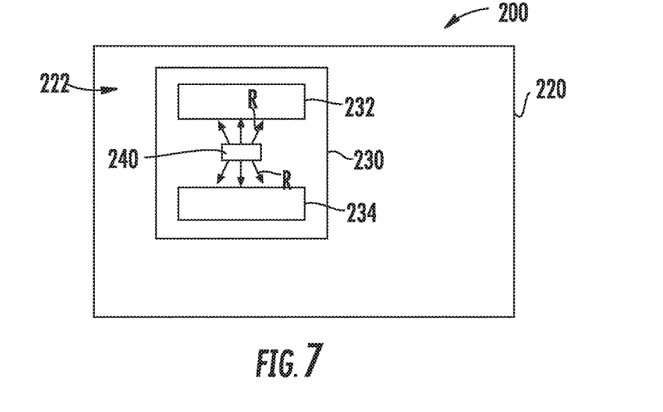

Turning now to FIGS. 4 through 7, control panel 200 includes a capacitive touch sensor 220. Capacitive touch sensor 220 may be any suitable type of capacitive touch sensor. FIGS. 4 and 5 provide schematic views of control panel 200 with capacitive touch sensor 220 configured as a self-capacitance sensor. When capacitive touch sensor 220 is a self-capacitance sensor, capacitive touch sensor 220 may detect a capacitance difference between first and second electrodes 232, 234 and a ground 236 of capacitive touch sensor 220. FIGS. 6 and 7 provide schematic views of control panel 200 with capacitive touch sensor 220 configured as a mutual-capacitance sensor. When capacitive touch sensor 220 is a mutual-capacitance sensor, capacitive touch sensor 220 may detect a capacitance difference between first and second electrodes 232, 234 of capacitive touch sensor 220. It will be understood that control panel 200 may include a plurality of capacitive touch sensors 220, e.g., with each capacitive touch sensor 220 corresponding to a respective one of the appliance function indicators 202 shown in FIG. 3.

Control panel 200 includes a dielectric substrate 210 having a front surface 212 and a back surface 214. Front surface 212 of dielectric substrate 210 and back surface 214 of dielectric substrate 210 are positioned opposite each other on dielectric substrate 210. Dielectric substrate 210 may be constructed of any suitable material. For example, dielectric substrate 210 may be constructed of glass or plastic, such as a transparent glass or plastic.

Control panel 200 also includes a printed circuit board 220 having a front surface 222 and a back surface 224. Front surface 222 of printed circuit board 220 and back surface 224 of printed circuit board 220 are positioned opposite each other on dielectric substrate 210. As shown in FIGS. 4 and 6, printed circuit board 220 is spaced from dielectric substrate 210. In particular, front surface 222 of printed circuit board 220 may be spaced from and/or not contact rear surface 214 of dielectric substrate 210. Thus, printed circuit board 220 may be disposed parallel to dielectric substrate 210.

A capacitive sensor 230 is positioned on or mounted to printed circuit board 220. For example, capacitive sensor 230 may be mounted to printed circuit board 220 at the front surface 222 of printed circuit board 220. Capacitive sensor 230 is configured for triggering when a user touches front surface 212 of dielectric substrate 210. In particular, capacitive sensor 230 can detect when a conductive material or any material with a dielectric different than air contacts or approaches dielectric substrate 210. As an example, dielectric substrate 210 can be positioned on cabinet 120 such that front surface 212 of dielectric substrate 210 faces outwardly. When a user touches front surface 212 of dielectric substrate 210 adjacent capacitive sensors 230, capacitive sensor 230 triggers and, e.g., signals the controller of refrigerator appliance 100. In such a manner, a user may initiate or control operations of refrigerator appliance 100 with control panel 200.

A light emitter 240 is also positioned on or mounted to printed circuit board 220. Light emitter 240 is operable to emit light R as shown in FIGS. 5 and 7. Light emitter 240 may be oriented such that the light R from light emitter 240 is directed towards dielectric substrate 210. Thus, e.g., the light R from light emitter 240 may pass through dielectric substrate 210 to illuminate appliance function indicators 202. Light emitter 240 may be any suitable light source. For example, light emitter 240 may be a light emitting diode or LED. In particular, light emitter 240 may be a top-view LED that is mounted to printed circuit board 220 at front surface 222 of printed circuit board 220 and is oriented for directing light R away from front surface 222 of printed circuit board 220 towards dielectric substrate 210. In particular, light emitter 240 may be integrated onto capacitive sensor 230, e.g., when light emitter 240 is a top-view LED. As another example, light emitter 240 may be a reverse-mount LED that is mounted to printed circuit board 220 at back surface 224 of printed circuit board 220 and is oriented for directing light R through printed circuit board 220 towards dielectric substrate 210. Printed circuit board 220 may define a hole (not shown) below light emitter 240 when light emitter 240 is a reverse-mount LED in order to allow the light R to pass through printed circuit board 220. By positioning light emitter 240 at back surface 224 of printed circuit board 220, light emitter 240 may be positioned further from back surface 214 of dielectric substrate 210 relative to when light emitter 240 at front surface 222 of printed circuit board 220, and the light R may have a greater spread or dispersion prior to passing through dielectric substrate 210.

As discussed above, the light R from light emitter 240 illuminates appliance function indicators 202 (FIG. 3). Appliance function indicators 202 may be positioned on dielectric substrate 210. With reference to FIG. 3, each one of appliance function indicators 202 can be positioned adjacent and correspond to a respective capacitive sensor 230. Thus, e.g., dielectric substrate 210 may be aligned with printed circuit board 220 such that each appliance function indicator 202 on dielectric substrate 210 is aligned with the respective capacitive sensor 230 on printed circuit board 220.

Appliance function indicators 202 are visible on front surface 212 of dielectric substrate 210, e.g., in order to guide user operation of control panel 200, when light emitters 240 are operating to emit the light R. As an example, each appliance function indicator 202 can include a distinct message or symbol corresponding to the appliance function associated with the underlying capacitive sensor 230. Appliance function indicators 202 may be formed in any suitable manner. For example, appliance function indicators 202 may be positioned directly on dielectric substrate 210. In particular, appliance function indicators 202 may be printed or produced onto front surface 212 or back surface 214 of dielectric substrate 210. As another example, appliance function indicators 202 may be formed from a film on dielectric substrate 210 that is cut to form voids where the light R passing through dielectric substrate 210 is blocked by the film or passes through the film at the holes to form appliance function indicators 202.

Figure 8:
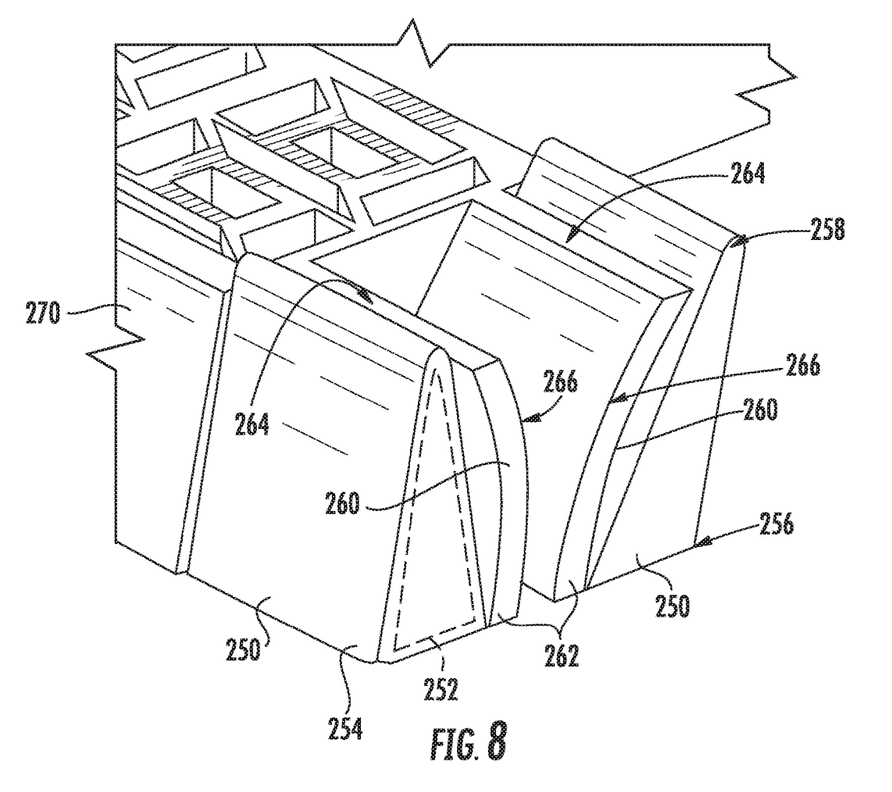
FIG. 8 provides a partial, section view of a pair of a pair of conductive bodies and a light guide of the exemplary control panel of FIG. 2.

FIG. 8 provides a partial, section view of a pair of a pair of conductive bodies 250 and a light guide 260 of control panel 200. As may be seen in FIGS. 4 and 6, conductive bodies 250 extend between dielectric substrate 210 and printed circuit board 220. Conductive bodies 250 provide conductive electrical connections between dielectric substrate 210 and capacitive sensor 230. In particular, each one of conductive bodies 250 may extend between and provide a conductive electrical coupling between dielectric substrate 210 and a respective electrode 232, 234 of capacitive sensor 230. Thus, e.g., an electrical field E may flow through conductive bodies 250 between dielectric substrate 210 and capacitive sensor 230, e.g., despite printed circuit board 220 being spaced from dielectric substrate 210.

Turning back to FIG. 8, conductive bodies 250 may be constructed to facilitate electrical communication between dielectric substrate 210 and capacitive sensor 230. For example, each of conductive bodies 250 may include a foam block 252 covered with a conductive fabric 254. Thus, e.g., conductive bodies 250 may be formed as a conductive fabric over foam pad. Foam block 252 may be wedge shaped with a wide end 256 of foam block 252 positioned on or at printed circuit board 220 and a narrow end 258 of foam block 252 positioned on dielectric substrate 210. Conductive bodies 250 may be compressed between dielectric substrate 210 and printed circuit board 220. For example, the narrow end 256 of foam block 252 may be compressed against dielectric substrate 210 to assist with insuring electrical communication between dielectric substrate 210 and capacitive sensor 230.

Light emitter 240 may be positioned between conductive bodies 250, e.g., such that conductive bodies 250 are positioned opposite each other about light emitter 240. Thus, the light R from light emitter 240 may be transmitted to dielectric substrate 210 between conductive bodies 250. Control panel 200 also includes features for assisting with transmitting or directing the light R from light emitter 240 towards dielectric substrate 210. In particular, as shown in FIG. 8, control panel 200 includes a light guide 260 positioned between dielectric substrate 210 and printed circuit board 220. Light guide 260 is positioned such that the light R emitted by light emitter 260 is reflected by light guide 260 towards dielectric substrate 210 during operation of light emitter 240. For example, light guide 260 may extend around light emitter 240 at printed circuit board 220 and reflect the light R towards dielectric substrate 210.

As shown in FIG. 8, light guide 260 may include a pair of bowed or arcuate sidewalls 262. Arcuate sidewalls 262 may be positioned opposite each other about light emitter 240. In addition, arcuate sidewalls 262 may be positioned between conductive bodies 250. Arcuate sidewalls 262 may be shaped to reflect the light R from light emitter 260 towards dielectric substrate 210 during operation of light emitter 240. An inner surface 266 of arcuate sidewalls 262 may also be white or coated with a reflective film in order to increase reflection of the light R from light emitter 240 relative to other colors or without films.

Dielectric substrate 210 may be positioned on and contact ends 264 of arcuate sidewalls 262, e.g., in order to assist with spacing dielectric substrate 210 from printed circuit board 220. In addition, narrow end 256 of foam block 252 may extend past or further than end 264 of arcuate sidewall 262 from printed circuit board 220, e.g., prior to compressing conductive bodies 250 between dielectric substrate 210 and printed circuit board 220. When dielectric substrate 210 is positioned on ends 264 of arcuate sidewalls 262 and/or on spacer block 270, the narrow end 256 of foam block 252 may be compressed to end 264 of arcuate sidewall 262.

Light guide 260 may be formed of or with any suitable material. For example, light guide 260 may be formed of or with plastic, such as molded plastic. In particular, as shown in FIG. 8, control panel 200 may include a spacer block 270 that extends between dielectric substrate 210 and printed circuit board 220. Dielectric substrate 210 may be positioned on and contact one side of spacer block 270 while printed circuit board 220 may be positioned on and contact the opposite side of spacer block 270. Thus, spacer block 270 may maintain the spacing between dielectric substrate 210 and printed circuit board 220. Light guide 260 may be integrally formed with spacer block 270. For example, light guide 260 and spacer block 270 may be a single, seamless piece of molded plastic. As another example, light guide 260 may be integrally formed with or part of dielectric substrate 210. Thus, e.g., light guide 260 may be positioned at rear surface 214 of dielectric substrate 210 when light guide 260 is integrally formed with or part of dielectric substrate 210.

Control panel 200 provides a dead front user interface. Thus, user inputs of control panel 200 are backlit when in an active state. Conversely, the user inputs of control panel 200 are not backlit when in an inactive state. In such a manner, control panel 200 may have the appearance of no buttons or inputs when in the inactive state in order to provide a clean, pleasant look. Control panel 200 shifts from the inactive state to the active state when a user touches or approaches dielectric substrate 210. Light emitter 240 operates to backlight an appliance function indicator 202 when the user touches or approaches dielectric substrate 210 and control panel 200 shifts to the active state. Thus, control panel 200 may improve a cosmetic appearance of an associated appliance, e.g., when control panel 200 is not in use, while also assisting a user with operating control panel 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. An appliance comprising:
a cabinet;
a control panel mounted to the cabinet, the control panel comprising
a dielectric substrate having a front surface and a back surface, the front and back surfaces positioned opposite each other on the dielectric substrate;
a printed circuit board spaced from the back surface of the dielectric substrate;
a light emitter positioned on the printed circuit board; and
a capacitive sensor positioned on the printed circuit board, the capacitive sensor comprising a pair of conductive bodies that extend between the dielectric substrate and the printed circuit board, each conductive body of the pair of conductive bodies providing a conductive electrical coupling between the dielectric substrate and a respective electrode of the capacitive sensor, the light emitter positioned between the conductive bodies of the pair of conductive bodies,
wherein the dielectric substrate is positioned on the cabinet such that the front surface of the dielectric substrate faces outwardly, such that the capacitive sensor is triggered when a user touches the front surface of the dielectric substrate, and such that an appliance function indicator is backlit by the light emitter through the dielectric substrate at the front surface of the dielectric substrate during operation of the light emitter.

2. The appliance of claim 1, wherein the control panel further comprises a light guide positioned between the dielectric substrate and the printed circuit board, the light guide positioned such that light emitted by the light emitter is reflected by the light guide towards the dielectric substrate during operation of the light emitter.

3. The appliance of claim 2, wherein the light guide comprises a pair of arcuate sidewalk, the arcuate sidewalls of the pair of arcuate sidewalls positioned opposite each other about the light emitter.

4. The appliance of claim 2, wherein the arcuate sidewalk of the pair of arcuate sidewalls are positioned between the conductive bodies of the pair of conductive bodies.

5. The appliance of claim 2, wherein the dielectric substrate is positioned on and contacts an end of each arcuate sidewall of the pair of arcuate sidewalls.

6. The appliance of claim 2, wherein an inner surface of each arcuate sidewall of the pair of arcuate sidewalls is white in order to reflect light emitted by the light emitter during operation of the light emitter.

7. The appliance of claim 2, wherein the light guide is integrally formed with a spacer block that extends from the printed circuit board to the dielectric substrate.

8. The appliance of claim 1, wherein the conductive bodies of the pair of conductive bodies are positioned opposite each other about the light emitter.

9. The appliance of claim 1, wherein each conductive body of the pair of conductive bodies comprises a foam block covered with a conductive fabric.

10. The appliance of claim 9, wherein the foam block is wedge shaped.

11. The appliance of claim 1, wherein the conductive bodies of the pair of conductive bodies are compressed between the dielectric substrate and the printed circuit board.

12. The appliance of claim 1, wherein the light emitter is a light emitting diode.

13. The appliance of claim 12, Wherein the printed circuit board has a front surface and a back surface, the front and back surfaces of the printed circuit board positioned opposite each other on the printed circuit board, the front surface of the PCB facing the back surface of the dielectric substrate, the capacitive sensor positioned on the printed circuit board at the front surface of the printed circuit board.

14. The appliance of claim 13, wherein the light emitting diode is a reverse mount light emitting diode that is positioned on the printed circuit board at the back surface of the printed circuit board.

15. The appliance of claim 13, wherein the light emitting diode is positioned on the printed circuit board at the front surface of the printed circuit board.

16. The appliance of claim 1, wherein the capacitive sensor is a self-capacitance sensor or a mutual-capacitance sensor.

17. An appliance comprising:
a cabinet;
a control panel mounted to the cabinet, the control panel comprising
a dielectric substrate having a front surface and a back surface, the front and back surfaces positioned opposite each other on the dielectric substrate;
a printed circuit board spaced from the back surface of the dielectric substrate;
a light emitting diode positioned on the printed circuit board;
a capacitive sensor positioned on the printed circuit board, the capacitive sensor comprising a pair of conductive bodies that are compressed between the dielectric substrate and the printed circuit board, each conductive body of the pair of conductive bodies providing a conductive electrical coupling between the dielectric substrate and a respective electrode of the capacitive sensor, the light emitting diode positioned between the conductive bodies of the pair of conductive bodies, each conductive body of the pair of conductive bodies comprising a foam block covered with a conductive fabric; and
a light guide positioned between the dielectric substrate and the printed circuit board, the light guide positioned such that light emitted by the light emitting diode is reflected by the light guide towards the dielectric substrate during operation of the light emitting diode,
wherein the dielectric substrate is positioned on the cabinet such that the front surface of the dielectric substrate faces outwardly, such that the capacitive sensor is triggered when a user touches the front surface of the dielectric substrate, and such that an appliance function indicator is illuminated at the front surface of the dielectric substrate during operation of the light emitting diode.

18. An appliance comprising:
a cabinet;
a control panel mounted to the cabinet, the control panel comprising
a dielectric substrate having a front surface and a back surface, the front and back surfaces positioned opposite each other on the dielectric substrate;
a printed circuit board spaced from the back surface of the dielectric substrate;
a light emitting diode positioned on the printed circuit board;
a capacitive sensor positioned on the printed circuit board, the capacitive sensor comprising a conductive body that is compressed between the dielectric substrate and the printed circuit board, the conductive body providing a conductive electrical coupling between the dielectric substrate and an electrode of the capacitive sensor; and
a light guide positioned between the dielectric substrate and the printed circuit board, the light guide positioned such that light emitted by the light emitting diode is reflected by the light guide towards the dielectric substrate during operation of the light emitting diode,
wherein the dielectric substrate is positioned on the cabinet such that the front surface of the dielectric substrate faces outwardly, such that the capacitive sensor is triggered when a user touches the front surface of the dielectric substrate, and such that an appliance function indicator is illuminated at the front surface of the dielectric substrate during operation of the light emitting diode.

* * * * *